(12) United States Patent
Hohlrieder et al.

(10) Patent No.: US 7,451,548 B2
(45) Date of Patent: Nov. 18, 2008

(54) DEVICE AND METHOD FOR MEASURING THE GEOMETRY OF A WHEEL AXLE OF A MOTOR VEHICLE

(75) Inventors: Michael Hohlrieder, Körle (DE); Holger Reichbott, Morschen (DE); Ralf Lamster, Kassel (DE)

(73) Assignee: AuE Automations und Einstelltechnik Kassel GmbH, Kassel (DE)

( * ) Notice: Subject to any disclaimer, the term of this patent is extended or adjusted under 35 U.S.C. 154(b) by 2 days.

(21) Appl. No.: 10/557,386

(22) PCT Filed: May 19, 2004

(86) PCT No.: PCT/DE2004/001061

§ 371 (c)(1),
(2), (4) Date: Nov. 17, 2006

(87) PCT Pub. No.: WO2004/104514

PCT Pub. Date: Dec. 2, 2004

(65) Prior Publication Data
US 2007/0089306 A1    Apr. 26, 2007

(30) Foreign Application Priority Data
May 20, 2003   (DE) ............................... 103 22 644

(51) Int. Cl.
*G01B 5/255* (2006.01)
(52) U.S. Cl. .................................. 33/203.18
(58) Field of Classification Search ............ 33/203.18
See application file for complete search history.

(56) References Cited

U.S. PATENT DOCUMENTS

| | | | |
|---|---|---|---|
| 4,296,626 A | 10/1981 | Jarman et al. | |
| 4,462,241 A | 7/1984 | Whisenant | |
| 4,782,596 A * | 11/1988 | Mieling | 33/203.18 |
| 4,918,821 A | 4/1990 | Bjork | |
| 5,033,198 A * | 7/1991 | Hastings | 33/203.18 |
| 5,168,632 A | 12/1992 | Rimlinger, Jr. | |
| 5,339,508 A * | 8/1994 | Ventress | 33/203.18 |
| 5,471,754 A | 12/1995 | Mieling | |
| 5,619,800 A | 4/1997 | Unruh | |
| 5,842,281 A * | 12/1998 | Mieling | 33/203.18 |
| 6,138,366 A * | 10/2000 | Boess | 33/203.18 |
| 6,282,799 B1 * | 9/2001 | Warkotsch | 33/203.18 |
| 6,622,389 B1 * | 9/2003 | Pellegrino | 33/203.18 |

(Continued)

FOREIGN PATENT DOCUMENTS

EP    1 128 157 A1    8/2001

*Primary Examiner*—Christopher W Fulton
(74) *Attorney, Agent, or Firm*—Thomas R. Vigil

(57) ABSTRACT

The invention relates to a device for measuring the geometry of a wheel axle of a motor vehicle, said device comprising a hub gripping element (20) for gripping and rotating a hub (50) of the wheel axle, and at least one measuring sensor (58). The invention also relates to a method using said device. The aim of the invention is to create one such device and one such method which enable measuring values to be much more precisely recorded. To this end, the hub gripping element (20) comprises at least one stud (42, 44, 46) that can be screwed into a threaded borehole on the hub (50) or the brake disk (62) in order to fix the wheel axle to the hub gripping element (20).

10 Claims, 4 Drawing Sheets

U.S. PATENT DOCUMENTS 7,117,603 B1 * 10/2006 Pellegrino ............... 33/203.18
7,174,646 B2 * 2/2007 Corghi .................... 33/203.18
2006/0096109 A1 * 5/2006 Corghi .................... 33/203.18

* cited by examiner

DEVICE AND METHOD FOR MEASURING THE GEOMETRY OF A WHEEL AXLE OF A MOTOR VEHICLE

CROSS-REFERENCE TO RELATED APPLICATIONS

This application claims Priority from German Application No. DE 103 22 644.3 filed on 20 May 2003.

BACKGROUND OF THE INVENTION

1. Field of the Invention

The present invention relates to a device for measuring the geometry of a wheel axle of a motor vehicle with a hub gripper for grasping and rotating a hub of the wheel axle and with at least one measuring sensor as well as to a method thereof.

2. Description of the Prior Art

From EP 1 128 157 A1 a hub gripper of a device for measuring the geometry of the wheel axles of an axle of a motor vehicle is known, in which the wheel hub is grasped by means of clamping jaws and is caused to rotate together with the rotation of the clamping jaws. On the rear side of the hub gripper there is formed a rotatable measuring surface that is rotatable together with the hub gripper and on which measurement actually takes place. Accordingly, the measurement is not performed directly on the hub or wheel axle but indirectly on the rear side of the hub gripper. This is a source of errors in measurements because for example the hub gripper does not grasp the hub precisely coaxially and/or the component parts used on the hub gripper exhibit manufacturing tolerances.

BRIEF SUMMARY OF THE INVENTION

In view thereof, it is the object of the present invention to provide a device and a method for measuring the geometry of a wheel axle of a motor vehicle that permits to record the measured values with much more precision.

As a technical approach to achieve this object, the invention proposes a device for measuring the geometry of a wheel axle of a motor vehicle, with a hub gripper for grasping and rotating a hub of the wheel axle and with at least one measuring sensor, characterized in that, in order to retain the wheel axle on the hub gripper, the hub gripper includes at least one stud that is screwable into a threaded borehole provided in the hub or in the brake disk or that the hub gripper includes at least one screw sleeve that is screwable to a threaded bolt provided on the hub or the brake disk and a method for measuring the geometry of a wheel axle of a motor vehicle by means of a device for measuring the geometry of a wheel axle of a motor vehicle, a hub gripper of the device being first brought in proximity to the hub of the wheel axle, characterized in that, in order to fasten the hub gripper to the hub, at least one stud of the hub gripper is screwed into a threaded borehole of the hub or that, in order to fasten the hub gripper, at least one screw sleeve of the hub gripper is screwed to a threaded bolt.

A device configured in accordance with this technical teaching and a method carried out in accordance with this technical teaching have the advantage that by tightening the studs the hub or the brake disk are pulled to directly fit against the contact surface so that it is ensured that the hub gripper precisely fits against the hub or the brake disk. Another advantage is that by tightening the hub gripper the latter is forced to coaxially align with the wheel axle, similar to a wheel rim. This permits to prevent potential errors in measurement due to inaccurate clamping.

The same applies in analogous fashion in the event threaded bolts are provided on the hub. In this case, individually rotatable screw sleeves are mounted to the hub gripper, said screw sleeves being screwed onto the threaded bolts of the hub with the aforementioned benefits also appearing here.

Another advantage is that this registration fit ensures that the hub gripper will absolutely fit against the hub or the brake disk when the measurement is actually being performed. This registration fit ensures for example that the gripper will not slip out of place with respect to the wheel hub even if the driving situation is simulated, when the hub gripper rotates, together with parts of the wheel axle, about the longitudinal axis and/or when vertical impacts are exerted onto the wheel axle. As a result, it is made certain that even while recording the measured values, the hub gripper will always remain coaxial and in the desired position with respect to the hub and the wheel axle, which finally leads to an increased accuracy of the measured values.

Still another advantage is that by tightening the stud or by screwing the screw sleeve it is also possible to precisely and reliably hold wheel axles having segmented hubs.

In a preferred developed implementation, an insertion aid is provided by means of which the hub gripper is capable of sensing the hub of the wheel axle and of being guided into the right position with respect to the hub. Such accurate guiding and positioning of the hub gripper is advantageous in order to subsequently facilitate automatic tightening of the threaded bolts or of the screw sleeves.

It has thereby been found advantageous to equip the insertion aid with three taper pins and one hub receptacle, said hub being guided into said hub receptacle by the taper pins.

One advantage of configuring the taper pins so that they are adapted to be countersunk is that they disappear in the countersink when the hub is caused to fit against the hub gripper so that they are not hindering.

After the hub gripper has been positioned onto the hub in this manner, said hub gripper starts to rotate slowly until a feeler, more specifically a feeler pin, engages a threaded borehole provided on the wheel hub. Now, the hub gripper is accurately positioned with respect to the hub and the various studs or screw sleeves are allowed to either engage into still unoccupied threaded boreholes or to be applied to still free threaded bolts in order to screw the hub gripper to the hub.

With such a device of the invention, the hub gripper and, as a result thereof, important parts of the device for measuring the geometry are fastened to the wheel axle in a manner similar to the one used for the wheel rim. The driving properties may thus be very well simulated so that the measured values obtained therewith are also very realistic.

In a preferred embodiment, there is configured on the hub gripper a defined contact surface at which the hub or the brake disk is aligned. The advantage thereof is that the defined fit provided for the hub gripper against the wheel axle prevents said hub gripper from becoming wedged or jammed. Also, by finishing accordingly the contact surface, a very precise fit of the hub gripper against the hub or the brake disk may be provided, which further increases measurement precision.

In a preferred developed implementation, a measurement surface on which the measuring sensors measure the actual wheel axle is formed on the hub gripper. In order to accommodate or find out the manufacturing tolerances of the various component parts it has been found advantageous to configure this measurement surface to be integral with the contact surface. The advantage thereof is that on the one side the contact surface together with the measurement surface can be implemented with great precision in order to reduce errors in measurement and that on the other side the measurement surface and the contact surface may each be measured with great precision so that these measurement data may then be used as correction values when measuring the geometry of the wheel axle.

Further advantages of the device of the invention and of the method of the invention will become apparent in the appended drawings and in the following description of embodiments thereof. Likewise, the invention lies in each and every novel feature or combination of features mentioned above or described herein after. The embodiments discussed herein are merely exemplary in nature and are not intended to limit the scope of the invention in any manner.

DETAILED DESCRIPTION OF THE INVENTION

Figure 1:
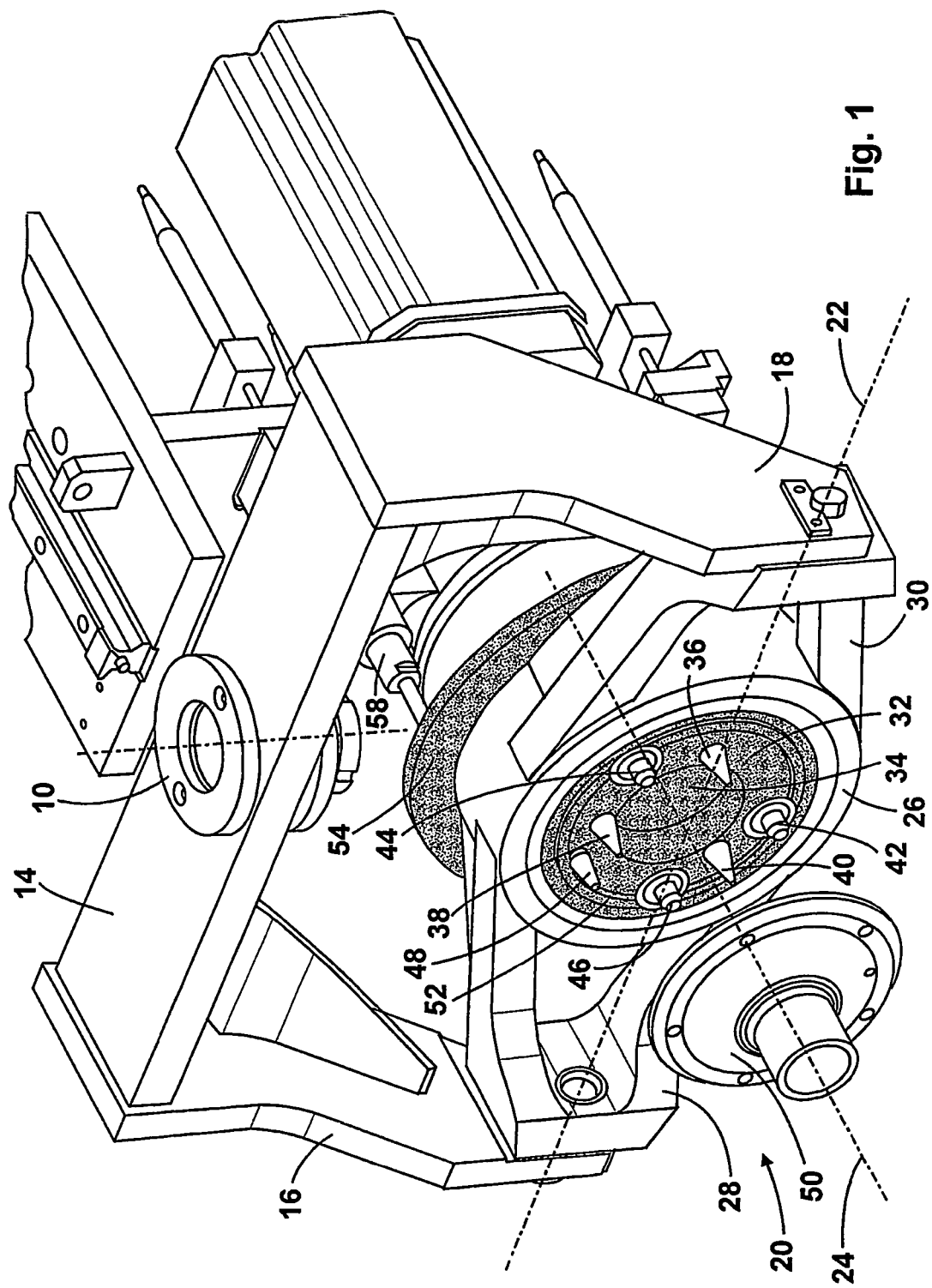
FIG. 1 is a perspective illustration of a first embodiment of a device of the invention.
Figure 2:
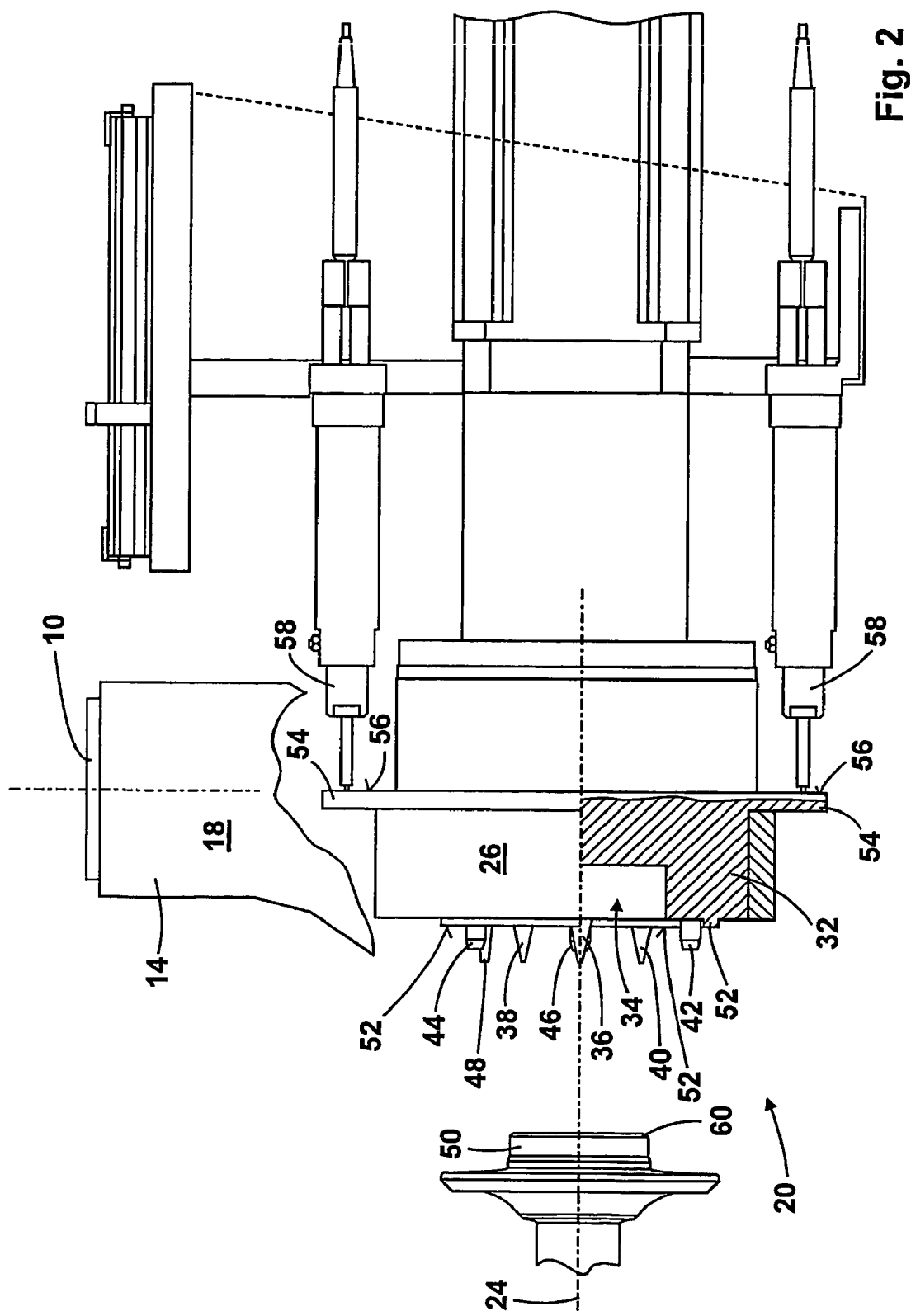
FIG. 2 is a partial sectional side view of the device in accordance with FIG. 1.

In the FIGS. 1 and 2 there is illustrated a first embodiment of a device of the invention for measuring the geometry of wheel axles of a motor vehicle, more specifically for measuring the toe angle and/or camber. This device serves to automatically measure industrially manufactured wheel axles. This means that during series manufacturing of new wheel axles for motor vehicles the camber and toe angle of the wheels is only roughly preset during assembly of the various component parts. For more precise setting of the camber and the toe angle, the wheel axle is positioned at a defined position on the assembly line and the device for measuring the geometry of the wheel axle is fully automatically brought in proximity to the hub of the wheel axle. The toe angle and camber values are thereby advantageously obtained taking into consideration the wobbling of the hub or of the brake disk.

At need, a second device for measuring the geometry of the wheel axle can be brought in proximity to the second wheel hub so that the two sides of the axle may be measured and set simultaneously. The device for measuring the geometry of wheel axles of a motor vehicle illustrated in the FIGS. 1 and 2 includes a receptacle 10 that is float mounted on a post (not shown) and is hinge-linked through a vertically oriented pivot hinge 12 to a substantially U-shaped retaining arm 14. A hub gripper 20 is attached to two legs 16, 18 of the retaining arm 14. In contrast to the vertically rotatable pivot hinge 12, the hub gripper 20 is retained in the retaining arm 14 so as to be horizontally pivotable with a pivot axis 22 intersecting a longitudinal axis 24 of the hub gripper 20.

The hub gripper 20 includes a body 26 that is pivotally attached to the legs 16, 18 of the retaining arm 14 via supporting arms 28, 30. A rotation element 32 is embedded for rotation about the longitudinal axis 24 into body 26, a cylindrical free space formed as a hub receptacle 34 being provided in the center of its front side. Directly on the border of this hub receptacle 34 three taper pins 36, 38, 40 are evenly spaced on the circumference, with the foot of the taper pins 36, 38, 40 directly fitting against the border of the hub receptacle 34. These taper pins 36, 38, 40 are configured so as to be adapted to be countersunk and disappear inside the rotation element 32 when a force is applied onto the point of a respective one of the taper pins 36, 38, 40. The taper pins 36, 38, 40 are spring biased and are accordingly immediately pushed out of the rotation element 32 as soon as the force acting onto the taper point subsides.

Three studs 42, 44, 46 and one feeler pin 48, the centers of a respective one of which are spaced the same distance apart from the longitudinal axis 24, are also provided on the front side of the rotation element 32, but farther away from the longitudinal axis 24 than the taper pins 36, 38, 40. The studs 42, 44, 46 and the feeler pin 48 are thereby spaced about the circumference so as to be capable of engaging a threaded borehole of a hub 50 of the wheel axle that has not been illustrated herein. Just like the taper pins 36, 38, 40, the studs 42, 44, 46 and the feeler pin 48 are thereby adapted to be countersunk into the rotation element 32 and spring biased. The studs 42, 44, 46 are concurrently driven by an electric motor that has not been illustrated herein and are rotatable about their longitudinal axis so that the studs 42, 44, 46 are adapted for screwing and unscrewing into a threaded borehole provided on the hub 50.

The torque is adjustable for every single stud 42, 44, 46. Further, every single stud 42, 44, 46 is adjustable depending on the direction of rotation and so that its torque is limited in such a manner that the unscrewing torque may be greater than the tightening torque.

Further, a ring-shaped contact surface 52 protruding slightly from the front side of the rotation element 32 is formed on the front side of the rotation element 32. In the embodiment illustrated herein, the ring-shaped contact surface 52 is provided with disruptions so that the ring is not closed. This contact surface 52 serves as an abutment surface for the hub 50 as soon as the studs 42, 44, 46 are screwed into the corresponding threaded boreholes.

The rotation element 32 extends from this front side turned toward the hub 50 and ends behind the supporting arms 28, 30 where it comprises a circumferential, radially projecting collar 54 comprising on its side turned away from the hub 50 a planar surface of measurement 56. Measuring sensors 58 for measuring the wheel axle are then placed onto said surface of measurement 56.

Herein after there will be described in detail how the hub gripper 20 is coupled to the hub 50:

Once the wheel axle to be measured has arrived in the measuring and adjusting station that have not been illustrated herein, the device for measuring the camber and the toe angle is also brought to this station. Next, the hub gripper 20 is moved toward the hub and brought in proximity to the hub 50 in such a manner that the taper pins 36, 38, 40 grasp the hub neck 60. As the hub gripper 20 is now moved into further proximity to the hub the hub neck 60 glides alongside one or a plurality of the taper pins 36, 38, 40, thus reaching the hub receptacle 34. The hub gripper 20 is thereby aligned, this being facilitated by the fact that the hub gripper 20 is rotatable about the vertical axis of rotation of the pivot hinge 12 and is retained so as to be horizontally pivotable about the pivot axis 22. This is further facilitated by having the hub gripper 20 being float-mounted via the receptacle 10 so that the taper pins 36, 38, 40 acting as an insertion aid cause the hub gripper 20 to be aligned substantially coaxially with the longitudinal axis of the wheel axle that has not been illustrated herein.

Now, the hub gripper 20 is moved into proximity to the hub 50 until it abuts on the contact surface 52. The spring biased taper pins 36, 38, 40, the spring biased studs 42, 44, 46 and the spring biased feeler pin 48 are thereby pushed one after the other inside the rotation element 32. As soon as the hub gripper 20 abuts with its entire contact surface 52 against the hub 50, the hub gripper 20 is slowly caused to rotate until the feeler pin 48 snaps into a threaded borehole (not shown) provided on the wheel hub 50. The feeler pin 48 is thereby configured to taper so as to also feel the threaded borehole when the longitudinal axis of the wheel axle and the longitudinal axis 24 of the hub gripper 20 are slightly offset. Once the hub gripper 20 and the hub 50 are coaxially aligned, centering is finally achieved when the conical feeler pin 48 engages the threaded borehole so that the hub gripper 20 is displaced in a plane perpendicular to the longitudinal axis 24 until the longitudinal axis 24 coincides with the longitudinal axis of the wheel axle. Now, the studs 42, 44, 46 are driven and screw themselves into a respective one of the threaded boreholes. The studs 42, 44, 46 are thereby tightened until the surface contact 52 of the hub gripper 20 reliably and immovably abuts against the hub 50. Such a tight connection between the hub gripper 20 and the hub 50 and the concurrent alignment of the hub gripper 20 with the hub 50 or the wheel axle respectively permit to mount the hub gripper 20 to the wheel axle in a manner similar to that of a wheel rim.

Now, the actual measurement of the geometry of the wheel axle may start, with the measuring sensors 58 being brought into proximity to the surface of measurement 56 so that the situation of the wheel axle may be directly measured. The tight and direct connection of the hub gripper 20 permits to make certain that during the entire measurement, that is, also when the hub gripper 20 rotates and when other forces are applied to simulate the driving properties, the surface of measurement 56 is always in direct alignment with the hub. As a result, the hub gripper 20 cannot get wedged or displaced with respect to the hub 50 or the wheel axle so that such sources of error are eliminated. The direct abutment of the contact surface 52 of the hub gripper 20 against the hub 50 and the integral connection between the surface of measurement 56 and the contact surface 52 also make certain that manufacturing tolerances are either non-existing or are known thanks to previous calibration of the surface of measurement 56 and may thus be taken out from the calculation.

Figure 3:
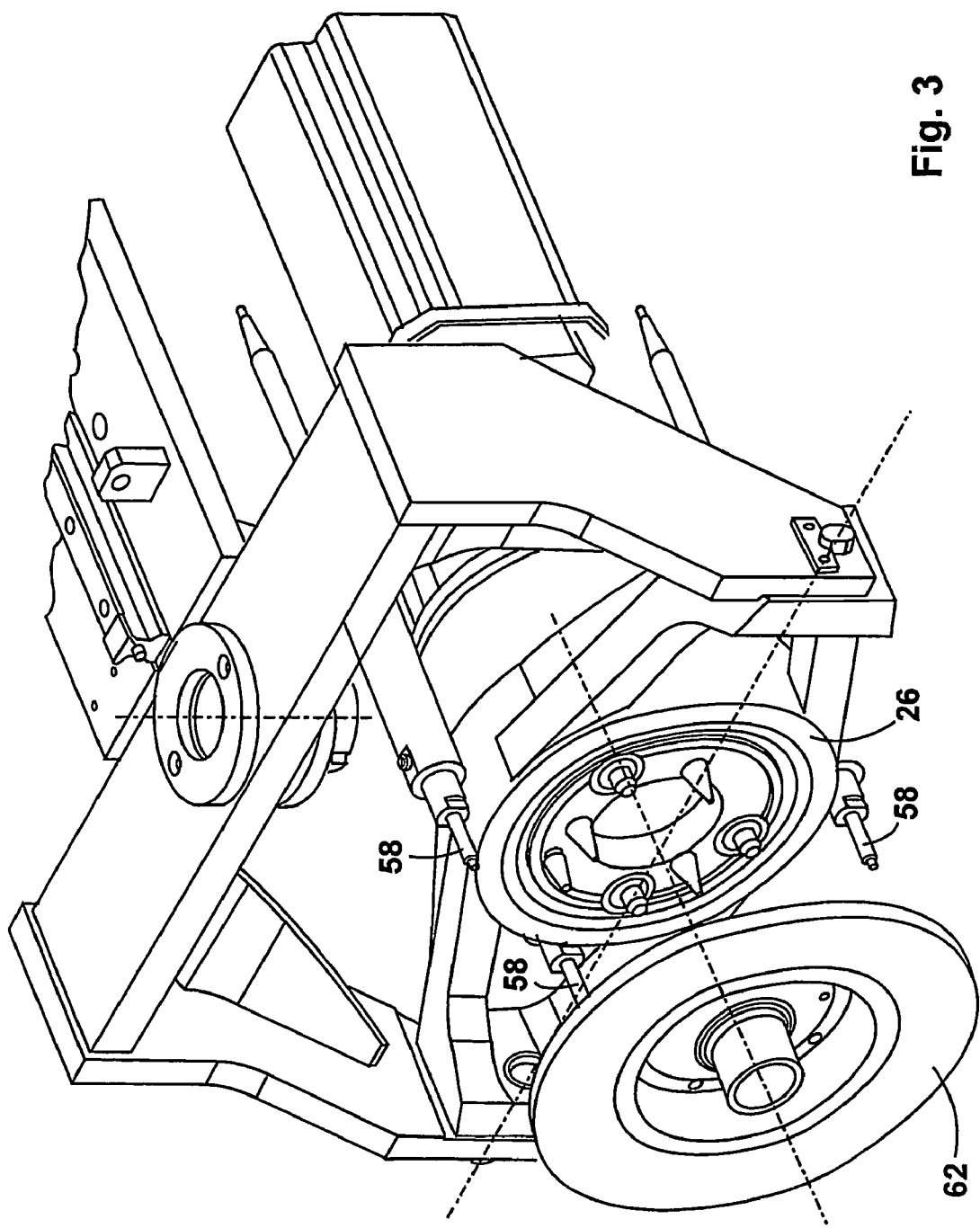
FIG. 3 is a perspective illustration of a second embodiment of a device of the invention.
Figure 4:
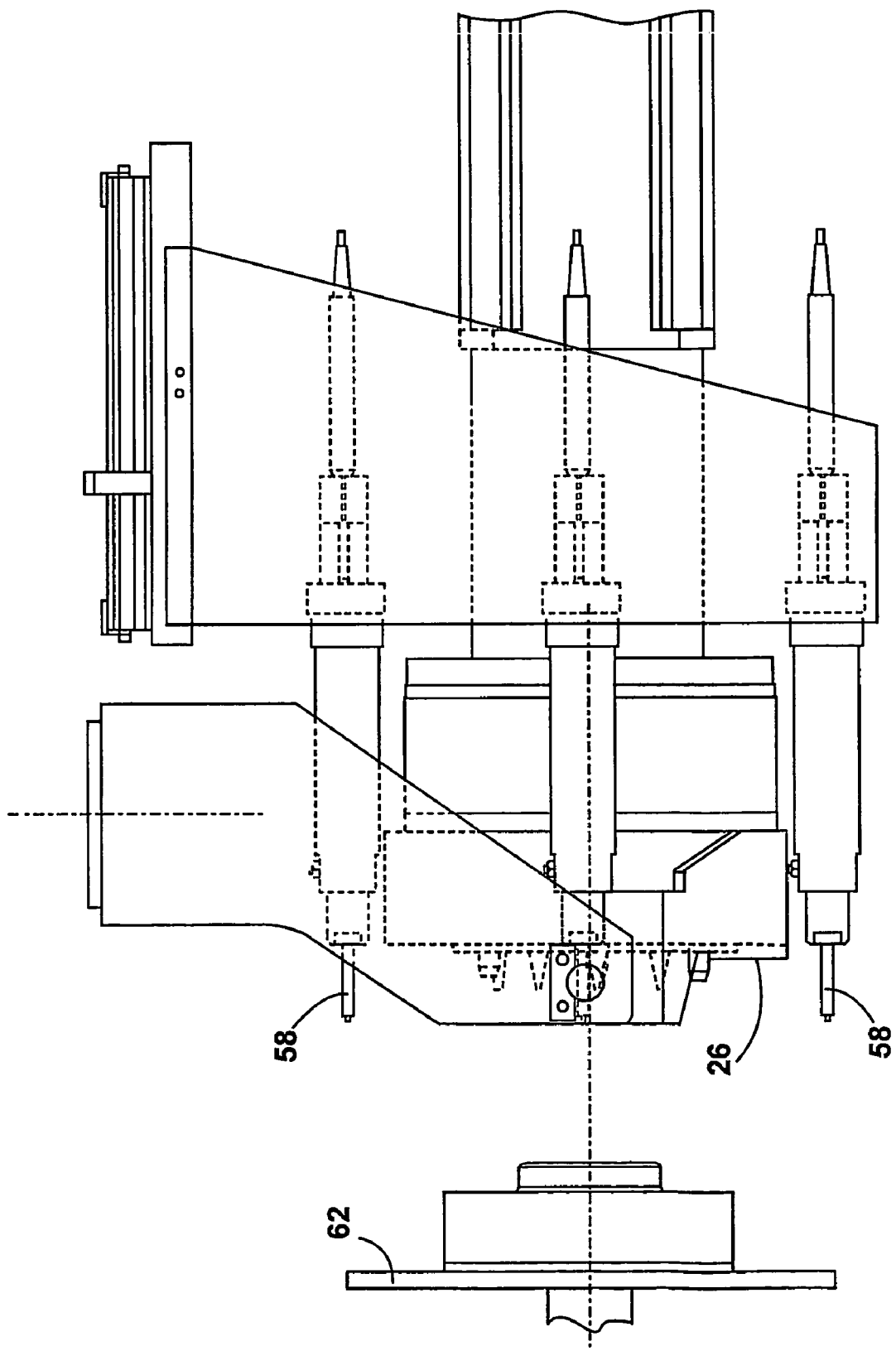
FIG. 4 is a partial sectional side view of the device in accordance with FIG. 1.

The second embodiment of a device of the invention shown in the FIGS. 3 and 4 is substantially built according to the same principle as the first embodiment shown in the FIGS. 1 and 2. The only difference is that in this second embodiment the surface of measurement 56 is missing and that the measuring sensors 58 may be guided past the body 26 and forwarded to a brake disk 62 mounted to the hub 50. In this embodiment, the wheel axle is measured directly on the brake disk, meaning directly at the wheel axle so that again manufacturing tolerances cannot occur and that here, thanks to direct measurement, the possible wedging or displacement of the hub gripper with respect to the wheel axle will not cause errors in measurement.

In another embodiment that has not been illustrated herein, the contact surface is not ring-shaped but square. Again it is possible to assemble the contact surface from a number of smaller, isolated surfaces distributed over the front side of the rotation element.

In still another embodiment that has not been illustrated herein, threaded bolts onto which the wheel rim will be attached later by means of wheel nuts are provided on the hub of the wheel axle. Consistent therewith, the hub gripper of this embodiment does not comprise studs but screw sleeves performing an analogous function. The only difference is that the screw sleeves are screwed with their internal thread onto the threaded bolts of the hub. It should be understood that the screw sleeves are also screwable individually, adjustable depending on the direction of rotation and so that their torque is limited and adapted to be countersunk.

Moreover, in this embodiment, the feeler pin is replaced by either a feeler shell or an electronic feeler system that detects the presence of the threaded bolt and induces, similarly to the feeler pin, fine adjustment of the hub gripper before the screw sleeves are then screwed onto the threaded bolts. The above mentioned functions and advantages also apply in similar fashion to this embodiment.

LIST OF NUMERALS 10 receptacle
12 pivot hinge
14 retaining arm
16 leg
18 leg
20 hub gripper
22 pivot axis
24 longitudinal axis
26 body
28 supporting arm
30 supporting arm
32 rotation element
34 hub receptacle
36 taper pin
38 taper pin
40 taper pin
42 stud
44 stud
46 stud
48 feeler pin
50 hub
52 contact surface
54 collar
56 surface of measurement
58 measuring sensor
60 hub neck
62 brake disk

We claim:

1. A device for measuring the geometry of a wheel axle of a motor vehicle, with a hub gripper (20) for grasping and rotating a hub (50) of the wheel axle and with at least one measuring sensor,
   characterized in that, in order to retain the wheel axle on the hub gripper (20), said hub gripper includes at least one stud (42, 44, 46) that is screwable into a threaded borehole provided in the hub (50) or in the brake disk (62) and in that the insertion aid comprises three taper pins (36, 38, 40) and one hub receptacle (34) with the taper pins (36, 38, 40) being disposed on the border of said hub receptacle (34).

2. The device as set forth in claim 1,
   characterized in that an insertion aid for bringing the hub gripper (20) in proximity to the wheel axle is provided on said hub gripper (20).

3. The device as set forth in claim 1,
   characterized in that the taper pins (36, 38, 40) are adapted to be countersunk.

4. The device as set forth in claim 1,
   characterized in that a defined contact surface (52) for aligning and/or for providing defined abutment of the hub gripper (20) with the hub (50) or a brake disk (62) of the wheel axle is provided on the hub gripper (20).

5. A device for measuring the geometry of a wheel axle of a motor vehicle, with a hub gripper (20) for grasping and rotating a hub (50) of the wheel axle and with at least one measuring sensor, characterized in that, in order to retain the wheel axle on the hub gripper (20), said hub gripper includes at least one stud (42, 44, 46) that is screwable into a threaded borehole provided in the hub (50) or in the brake disk (62) and in that a feeler, more specifically a feeler pin (48), is provided on the hub gripper (20).

6. A device for measuring the geometry of a wheel axle of a motor vehicle, with a hub gripper (20) for grasping and rotating a hub (50) of the wheel axle and with at least one measuring sensor, characterized in that, in order to retain the wheel axle on the hub gripper (20), said hub gripper includes at least one stud (42, 44, 46) that is screwable into a threaded borehole provided in the hub (50) or in the brake disk (62) and in that a surface of measurement (56) for providing abutment for the at least one measuring sensor (58) is provided on the hub gripper (20), with said surface of measurement (56) being integrally connected to the contact surface (52).

7. A method for measuring the geometry of a wheel axle of a motor vehicle by means of a device for measuring the geometry of a wheel axle of a motor vehicle, a hub gripper (20) of the device being first brought in proximity to the hub (50) of the wheel axle, characterized in that, in order to fasten the hub gripper (20) to the hub (50), at least one stud (42, 44, 46) of the hub gripper (20) is screwed into a threaded borehole of the hub (50) and in that, once in defined abutment against the hub (50), the hub gripper (20) rotates slowly about its longitudinal axis (24) until a feeler engages a threaded bore or is applied to a threaded bolt.

8. The method as set forth in claim 7, characterized in that the hub gripper (20) is aligned so that the hub (50) is brought into defined abutment with a contact surface (52) of said hub gripper (20).

9. The method as set forth in claim 8, characterized in that the geometry of the wheel axle is measured at a surface of measurement (56) of the hub gripper (20) that is located in a defined position relative to the contact surface (52).

10. The method as set forth in claim 7, characterized in that the hub gripper (20) is brought into proximity of the hub (50) by means of an insertion aid and is thereby aligned.

\* \* \* \* \*